United States Patent
Takata et al.

(10) Patent No.: US 10,622,741 B2
(45) Date of Patent: Apr. 14, 2020

(54) ANTICORROSIVE AGENT AND TERMINAL FITTED ELECTRIC WIRE

(71) Applicants: AUTONETWORKS TECHNOLOGIES, LTD., Yokkaichi-shi, Mie (JP); SUMITOMO WIRING SYSTEMS, LTD., Yokkaichi-shi, Mie (JP); SUMITOMO ELECTRIC INDUSTRIES, LTD., Osaka-shi, Osaka (JP); KYUSHU UNIVERSITY, Fukuoka-shi, Fukuoka (JP)

(72) Inventors: Yutaka Takata, Yokkaichi (JP); Takehiro Hosokawa, Yokkaichi (JP); Tatsuya Hase, Yokkaichi (JP); Naoyuki Oshiumi, Yokkaichi (JP); Takuya Yamashita, Yokkaichi (JP); Makoto Mizoguchi, Fukuoka (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP); KYUSHU UNIVERSITY, Fukuoka (JP)

( * ) Notice: Subject to any disclaimer, the term of this patent is extended or adjusted under 35 U.S.C. 154(b) by 0 days.

(21) Appl. No.: 16/060,060

(22) PCT Filed: Dec. 21, 2016

(86) PCT No.: PCT/JP2016/088032
§ 371 (c)(1),
(2) Date: Jun. 7, 2018

(87) PCT Pub. No.: WO2017/119290
PCT Pub. Date: Jul. 13, 2017

(65) Prior Publication Data
US 2019/0173213 A1    Jun. 6, 2019

(30) Foreign Application Priority Data

Jan. 7, 2016 (JP) ................. 2016-001449

(51) Int. Cl.
| H01R 13/03 | (2006.01) |
| H01R 4/18 | (2006.01) |
| C23F 11/00 | (2006.01) |
| C23F 11/167 | (2006.01) |
| H01B 7/28 | (2006.01) |
| C09D 7/40 | (2018.01) |
| C08K 5/521 | (2006.01) |
| C09D 5/08 | (2006.01) |
| H01R 4/70 | (2006.01) |

(52) U.S. Cl.
CPC ............. *H01R 13/03* (2013.01); *C08K 5/521* (2013.01); *C09D 5/08* (2013.01); *C09D 7/40* (2018.01); *C23F 11/00* (2013.01); *C23F 11/1673* (2013.01); *H01B 7/2806* (2013.01); *H01R 4/185* (2013.01); *H01R 4/70* (2013.01)

(58) Field of Classification Search
CPC .. C09D 5/08; C09D 7/40; C08K 5/521; C23F 11/00; C23F 11/1673; H01B 7/2806; H01R 4/70; H01R 4/185; H01R 13/03
See application file for complete search history.

(56) References Cited

U.S. PATENT DOCUMENTS

| 2010/0048436 A1* | 2/2010 | Litters | C10M 117/02 |
| | | | 508/174 |
| 2017/0062954 A1 | 3/2017 | Hase et al. | |
| 2017/0117650 A1 | 4/2017 | Yoshida et al. | |

FOREIGN PATENT DOCUMENTS

| CN | 101693851 A | 4/2010 | |
| EP | 1394289 A1 | 3/2004 | |
| JP | 2002-114989 A | 4/2002 | |
| JP | 2002-363592 A | 12/2002 | |
| JP | 2005-248264 A | 9/2005 | |
| JP | 2009227769 A * | 10/2009 | .......... C10M 137/06 |
| JP | 2015-151614 A | 8/2015 | |
| WO | 2015/125577 A1 | 8/2015 | |
| WO | 2015/146985 A1 | 10/2015 | |

OTHER PUBLICATIONS

Jan. 31, 2017 International Search Report issued in International Patent Application No. PCT/JP2016/088032.
Sep. 24, 2019 Office Action issued in Chinese Patent Application No. 201680076579.7.

* cited by examiner

*Primary Examiner* — Anthony J Green
(74) *Attorney, Agent, or Firm* — Oliff PLC

(57) ABSTRACT

An anticorrosive agent maintains its anticorrosion property when the agent is applied to the connection part of the terminal-fitted electric wire containing a covering member containing a plasticizer, and is exposed to high temperature. A terminal-fitted electric wire improves in anticorrosion property by using the agent. The anticorrosive agent contains a base oil (A) having a viscosity of 30 mPa·s or higher at 100° C., and a metal adsorbent (B) containing a phosphorus compound. The mass composition ratio (A):(B) of the base oil (A) and the metal adsorbent (B) is within a range of 50:50 to 98:2. In the terminal-fitted electric wire, an electric connection part between a terminal and an electric conductor is covered with a film of the anticorrosive agent.

5 Claims, 2 Drawing Sheets

ANTICORROSIVE AGENT AND TERMINAL FITTED ELECTRIC WIRE

TECHNICAL FIELD

The present invention relates to an anticorrosive agent and a terminal fitted electric wire.

BACKGROUND ART

In terminal-fitted electric wires, the electric connection part between wires (an electric wire conductor) and a terminal may be anticorrosion treated with an anticorrosive agent to avoid corrosion at the connection part. Such anti-corrosion treatment is effective, for example, where the wires are formed of an aluminum based material while the terminal is formed of a copper based material, and thus a different kind of metals are in contact with each other at the connection part and corrosion easily occurs at the connection part.

In metal equipment and metal parts, grease is conventionally used for the purpose of lubrication and corrosion resistance. The grease has a high viscosity at room temperature, and therefore, it is difficult to be applied thinly and uniformly. Patent Literature 1 describes a metal surface coating composition containing abase oil, and an adduct containing an alkyl acid phosphate and a metal. The metal surface coating composition described in Patent Literature 1 shows an excellent coating property.

CITATION LIST

Patent Literature

Patent Literature 1: JP 2015-151614 A

SUMMARY OF INVENTION

Problems to be Solved by the Invention

If the connection part of the terminal-fitted electric wire is coated with the metal surface coating composition containing a base oil and an adduct containing an alkyl acid phosphate and a metal for anticorrosion treatment, the composition is likely to leak from the connection part when the terminal-fitted electric wire is exposed to high temperature. Thus, the anticorrosion property may be lowered.

It is an object of the present invention to provide an anticorrosive agent maintaining its anticorrosion property when the agent is applied to the connection part of the terminal-fitted electric wire having a covering member containing a plasticizer, and is exposed to high temperature. It is also an object of the present invention to provide a terminal-fitted electric wire improved in anticorrosion property by using the agent.

Solution to Problem

The inventors of the present invention have found that the leak of the metal surface coating composition from the connection part is caused because the plasticizer contained in the covering member of the terminal-fitted electric wire is absorbed in the composition applied on the connection part, and the flowable temperature of the composition is lowered. This is presumably because of high affinity between the base oil of the composition and the plasticizer. Based on the findings, the inventors have accomplished the present invention.

In order to solve the above-described problem, the anticorrosive agent according to the present invention contains a base oil (A) having a viscosity of 30 mPa·s or higher at 100° C., and a metal adsorbent (B) containing a phosphorus compound, wherein a mass composition ratio (A):(B) of the base oil (A) and the metal adsorbent (B) is within a range of 50:50 to 98:2.

The metal adsorbent (b) is preferably a composition of a phosphorus compound containing one or more compounds represented by the general formulae (1) and (2) and a metal:

[Chem. 1]

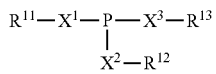

(1)

[Chem. 2]

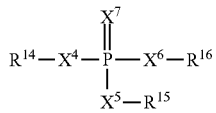

(2)

where $X^1$ to $X^7$ each represent independently an oxygen atom or a sulfur atom, $R^{11}$ to $R^{13}$ each represent independently a hydrogen atom or a hydrocarbon group having 1 to 30 carbon atoms, among which at least one is a hydrocarbon group having 1 to 30 carbon atoms, and $R^{14}$ to $R^{16}$ each represent independently a hydrogen atom or a hydrocarbon group having 1 to 30 carbon atom among which at least one is a hydrocarbon group having 1 to 30 carbon atoms.

The phosphorus compound preferably has one or more branched linear structures or one or more carbon-carbon double bond structures in the structure of the hydrocarbon groups.

The metal forming the composition together with the phosphorus compound is preferably at least one selected from alkali metals, alkaline earth metals, aluminum, titanium, and zinc.

The composition of the phosphorus compound and the metal preferably has a molecular weight of 3000 or lower.

An electric connection part between a terminal and an electric conductor of a terminal-fitted electric wire according to the present invention is covered with the anticorrosive agent.

Advantageous Effects of Invention

The anticorrosive agent according to the present invention contains at the specific mass composition ratio the base oil (A) having a viscosity of 30 mPa·s or higher at 100° C., and the metal adsorbent (B) containing the phosphorus compound. Having this composition, the anticorrosive agent maintains its anticorrosion property when the agent is applied to the connection part of the terminal-fitted electric wire containing a covering member containing a plasticizer, and is exposed to high temperature.

The metal adsorbent (b) is the composition of a phosphorus compound containing one or more compounds represented by the general formulae (1) and (2) and the metal, showing an excellent adhesion to the metal surface and further preventing the leak from the metal surface.

When the phosphorus compound has one or more branched linear structures or one or more carbon-carbon double bond structures in the structure of the hydrocarbon groups, the retention of the base oil is improved, and further the leak from the metal surface is prevented.

When the metal forming the composition together with the phosphorus compound is at least one selected from alkali metals, alkaline earth metals, aluminum, titanium, and zinc, an excellent adhesion to the metal surface is obtained and further the leak from the metal surface due to high ionization tendency of the metal is prevented.

When the composition of the phosphorus compound and the metal has a molecular weight of 3000 or lower, excellent compatibility with the base oil is obtained, the retention of the base oil is improved, and further the leak from the metal surface is prevented.

In the terminal-fitted electric wire according to the present invention, the electric connection part between the terminal and the electric conductor is covered with the anticorrosive agent, maintaining the anticorrosion property even when the terminal-fitted electric wire is exposed to high temperature.

DESCRIPTION OF EMBODIMENTS

Figure 1:
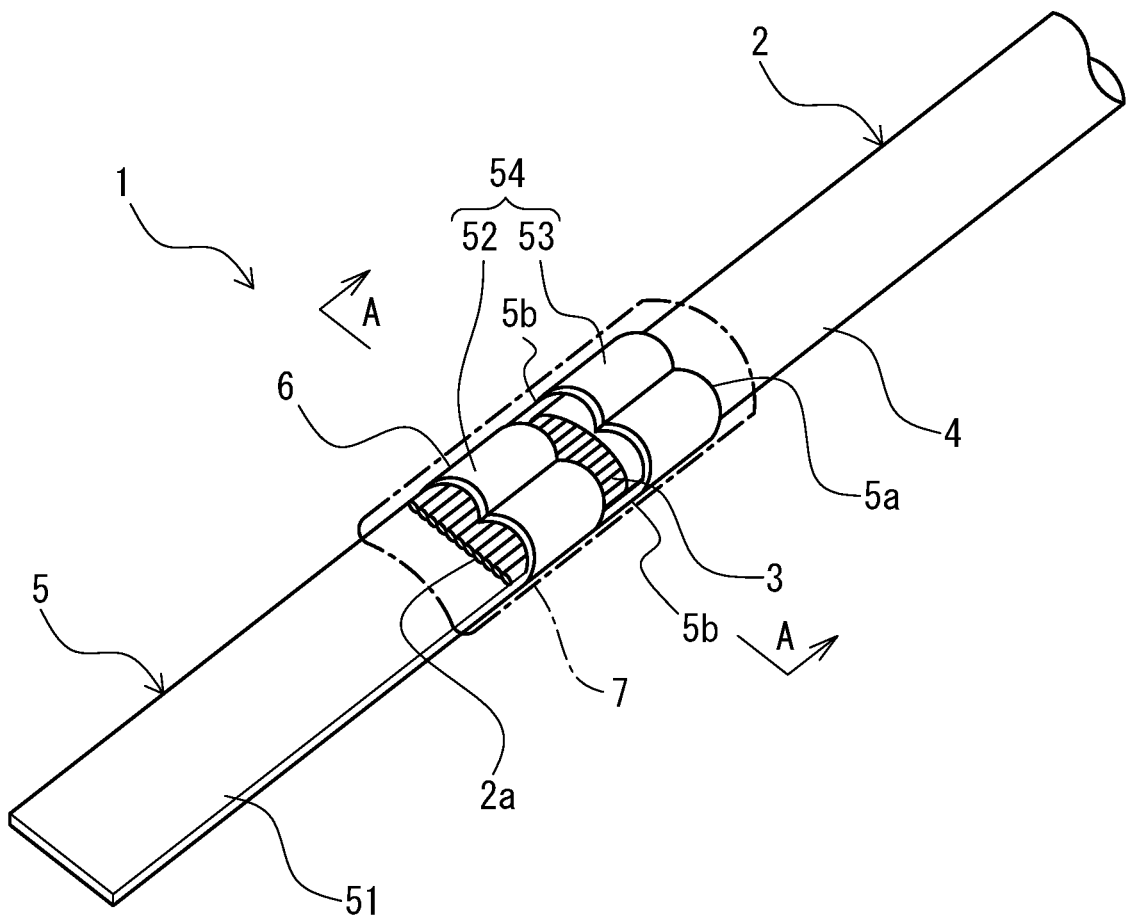
FIG. 1 is a perspective view of a terminal-fitted electric wire according to a preferred embodiment of the present invention.

Next, a preferred embodiment of the present invention is to be described specifically.

An anticorrosive agent according to the present invention (hereinafter sometimes referred to as the present anticorrosive agent) contains a base oil (A) having a viscosity of 30 mPa·s or higher at 100° C., and a metal adsorbent (B) containing a phosphorus compound.

To realize the features of the present invention, the base oil (A) having a viscosity of 30 mPa·s or higher at 100° C. is used. The viscosity is defined as a value at 100° C. at a shear rate of 100/s in accordance with JIS K7117-2. The viscosity may be measured using a cone-plate type rotary viscometer. The viscosity of the base oil is preferably 50 mPa·s or higher, more preferably 100 mPa·s or higher, and even more preferably 150 mPa·s or higher. Meanwhile, the viscosity of the base oil is preferably 200 mPa·s or lower and more preferably 150 mPa·s or lower, from the viewpoint of easiness in coating.

The base oil usable herein includes one of an arbitrary mineral oil, a wax isomerized oil, and a synthetic oil or a mixture of two or more of them used as usual lubricant base oils. The mineral oil usable herein are specifically paraffinic and naphthenic oils, and n-paraffin, which are purified from lubricant fractions contained by distillation under ordinary pressure or distillation under reduced pressure of crude oils by appropriately combining purification treatments such as solvent deasphaltation, solvent extraction, hydrocracking, solvent dewaxing, catalytic dewaxing, hydrorefining, sulfuric acid cleaning, and white clay treatment of a lubricant oil fractions.

The wax isomerized oils usable herein include those prepared through a hydrogen isomerization treatment of a wax raw material, such as natural wax, e.g., petroleum slack wax obtained through solvent dewaxing of a hydrocarbon oil, or a synthetic wax formed by the so-called Fischer Tropsch synthetic process, in which a mixture of carbon monoxide and hydrogen is brought in contact with a suitable synthetic catalyst at a high temperature and a high pressure. In a case of using the slack wax as the wax raw material, since the slack wax contains large amounts of sulfur and nitrogen, which are unnecessary in the base oil, it is desirable that the slack wax is hydrogenated as needed to prepare and use the wax having been reduced in the sulfur content and the nitrogen content, which is thus used as a raw material.

The synthetic oil is not particularly limited, and includes, for example, a poly-α-olefin, such as a 1-octene oligomer, 1-decene oligomer, and ethylene-propylene oligomer or a hydrogenated product thereof, isobutene oligomer and hydrogenated products thereof, isoparaffin, alkylbenzene, alkylnaphthalene, diester (for example, ditridecyl glutarate, di-2-ethylhexyl adipate, diisodecyl adipate, ditridecyl adipate, and di-2-ethylhexyl sebacate), polyol ester (for example, trimethylolpropane caprylate, trimethylolpropane pelargonate, pentaerythritol-2-ethylhexanoate, and pentaerythritol pelargonate), polyoxyalkylene glycol, dialkyl diphenyl ether, polyphenyl ether, etc.

The metal adsorbent (B) containing a phosphorus compound adsorbs on the metal surface such as of a terminal and electric wire conductors to be covered with the pre sent anticorrosive agent. The metal adsorbent (B) is preferably a composition of a phosphorus compound and a metal.

An example of the phosphorus compound contains one or more compounds represented by the following general formulae (1) and (2):

[Chem. 3]

(1)

[Chem. 4]

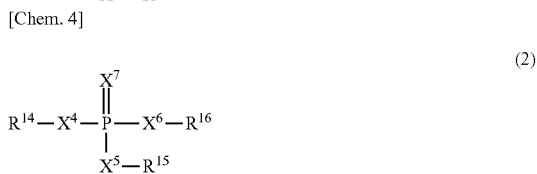

(2)

where $X^1$ to $X^7$ each represent independently an oxygen atom or a sulfur atom, $R^{11}$ to $R^{13}$ each represent independently a hydrogen atom or a hydrocarbon group having 1 to 30 carbon atoms and at least one of them is a hydrocarbon group having 1 to 30 of carbon atoms, $R^{14}$ to $R^{16}$ each represent independently a hydrogen atom or a hydrocarbon group having 1 to 30 carbon atom and at least one of them is a hydrocarbon group having 1 to 30 carbon atoms.

The hydrocarbon group includes, for example, alkyl group, cycloalkyl group, alkyl-substituted cycloalkyl group, alkenyl group, aryl group, alkyl-substituted aryl group, and aryl alkyl group.

The alkyl group includes, for example, methyl group, ethyl group, propyl group, butyl group, pentyal group, hexyl group, heptyl group, octyl group, nonyl group, decyl group, undecyl group, dodecyl group, tridecyl group, tetradecyl group, pentadecyl group, hexadecyl group, heptadecyl group, and octadecyl group. They may be either linear or branched.

The cycloalkyl group includes, for example, cyclopentyl group, cyclohexyl group, and cycloheptyl group. The alkyl-substituted cycloalkyl group includes, for example, methyl-cyclopentyl group, dimethylcyclopentyl group, methylethylcyclopentyl group, diethylcyclopentyl group, methylcyclohexyl group, diethylcyclohexyl group, methylethylcyclohexyl group, diethylcyclohexyl group, methylcycloheptyl group, dimethylcycloheptyl group, methylethylcyclopeptyl group, and diethylcycloheptyl group. The substitution position of the alkyl-substituted cycloalkyl group is not particularly restricted. The alkyl group may be linear or branched.

The alkenyl group includes, for example, butenyl group, pentenyl group, hexenyl group, heptenyl group, octenyl group, nonenyl group, decenyl group, undecenyl group, dodecenyl group, tridecenyl group, tetradecenyl group, pentadecenyl group, hexadecenyl group, heptadecenyl group, and octadecenyl group. They may be either linear or branched.

The aryl group includes, for example, phenyl group, and naphthyl group. Alkyl-substituted aryl group includes, for example, tolyl group, xylyl group, ethylphenyl group, propylphenyl group, butylphenyl group, pentylphenyl group, hexylphenyl group, heptylphenyl group, octylphenyl group, nonylphenyl group, decylphenyl group, undecylphenyl group and dodecylphenyl group. The substitution position of the alkyl substituted aryl group is not particularly restricted. The alkyl group may be linear or branched. The arylalkyl group includes, for example, benzyl group, phenylethyl group, phenylpropyl group, phenylbutyl group, phenylpengyl group, and phenylhexyl group. The alkyl group may be linear or branched.

All of $X^1$ to $X^7$ are preferably oxygen atoms. The hydrocarbon group of $R^{11}$ to $R^{16}$ having 1 to 30 carbon atoms are preferably hydrocarbon groups having 4 to 30 carbon atoms, and more preferably hydrocarbon groups having 8 to 30 carbon atoms.

Preferably, all of $X^1$ to $X^7$ are oxygen atoms. Preferably, at least one of $R^{11}$ to $R^{13}$ is a hydrogen atom and at least one of them is a hydrocarbon group having 1 to 30 carbon atoms. Preferably, at least one of $R^{14}$ to $R^{16}$ is a hydrogen atom and at least one of them is a hydrocarbon group having 1 to 30 carbon atoms.

The phosphorus compound represented by the general formula (1) includes, for example, phosphorous acid, monothiophosphorous acid, dithiophosphorous acid, phosphite monoester, monothiophosphite monoester, dithiophosphite monoester, phosphite diester, monothiophosphite diester, dithiophosphite diester, phosphite triester, monothiophosphite triester, and dithiophosphite triester. They may be used alone or two or more of them may be used in combination as the phosphorus compounds represented by the general formula (1).

The phosphorus compound represented by the general formula (2) includes, for example, phosphoric acid, monothiophosphoric acid, dithiophosphoric acid, phosphate monoester, monothiophosphate monoester, dithiophosphate monoester, phosphate diester, monothiophosphate diester, dithiophosphate diester, phosphate triester, monothiophosphate triester, and dithiophosphate triester. They may be used alone or two or more of them may be used in combination as the phosphorus compound represented by the general formula (2).

For the phosphorus compound, the compound represented by the general formula (2) is more preferred. Further, among the phosphorus compounds represented by the general formula (2), acidic phosphate ester represented by the following general formula (3) or general formula (4) is particularly preferred.

(Chem. 5)

$$P(=O)(-OR^{14})(-OH)_2 \qquad (3)$$

(Chem. 6)

$$P(=O)(-OR^{14})_2(-OH) \qquad (4)$$

The metal that forms the composition together with the phosphorus compound includes, for example, alkali metal such as Li, Na, and K, alkaline earth metal such as Mg and Ca, aluminum, titanium, zinc, etc. They may be used alone or two or more of them may be used in combination. The metals can provide high adsorption capacity to the metal surface due to their relatively high ionization tendency. Further, since the ionization tendency is, for example, higher than that of Sn, it can be excellent in the ion bondability to Sn. Among them, Ca and Mg are more preferred from a viewpoint for example, of waterproofness. The metal forming the composition with the phosphorus compound preferably has a valence of two or more from a viewpoint of increase of the molecular weight of the composition and heat resistance.

The metal source for the composition containing the phosphorus compound and the metal includes a metal hydroxide, a metal carboxylate, etc. The carboxylic acid of the metal carboxylate includes salicylic acid, benzoic acid, phthalic acid, etc. The metal salt of the carboxylic acid is a neutral salt. The metal source may be a basic salt, or may be a hyper basic salt.

In the composition of the phosphorus compound and the metal, when at least one of the hydrocarbon group of the phosphorus compound is a hydrocarbon group having 4 to 30 carbon atoms, the compatibility with the base oil, which is the long-chained alkyl compound, is improved. The hydrocarbon group is an organic group containing carbon and hydrogen but not containing hetero elements such as N, O, and S. Then, in view of the compatibility with the base oil which is the long-chained alkyl compound, the hydrocarbon group of the phosphorus compound is preferably an aliphatic hydrocarbon group or a cycloaliphatic hydrocarbon group. More preferably, it is an aliphatic hydrocarbon group.

The aliphatic hydrocarbon group includes alkyl group containing a saturated hydrocarbon and, an alkenyl group containing an unsaturated hydrocarbon, each of which may be used. The alkyl group or the alkenyl group as the aliphatic hydrocarbon group may be either in a linear or branched structure. However, when the alkyl group is a linear alkyl group such as an n-butyl group or n-octyl group, alkyl groups tend to be aligned to each other and increase the crystallinity of the composition of the phosphorus compound and the metal, lowering the solubility with the base oil. In view of the above, when the hydrocarbon group is an alkyl group, a branched alkyl group is more preferred compared to a linear alkyl group. On the other hand, since the alkenyl group has one or more carbon-carbon double bond structures, it has not so-high crystallinity even if it has a linear structure. Accordingly, the alkenyl group may either be linear or branched.

When the number of carbon atoms of at least one hydrocarbon group is less than 4, the phosphorus compound becomes inorganic. Further, the phosphorus compound tends to increase the crystallinity. Then, it shows poor solubility with the base oil and is no longer miscible with the base oil. On the other hand, if the number of carbon atoms of the hydrocarbon group is more than 30, the phosphorus compound shows excessively high viscosity and tends to lower the fluidity. The number of carbon atoms of the hydrocarbon group is preferably 5 or more and, more preferably, 6 or more in view of the compatibility with the base oil. Further, the number of carbon atoms of the hydrocarbon group is preferably 26 or less and, more preferably, 22 or less from a viewpoint of fluidity, etc.

Further, the composition of the phosphorus compound and the metal has a phosphate group (polar group) and a non-polar group (hydrocarbon group in the ester portion) together in the molecule, and can be present in a layered state in which polar groups are associated to each other and non-polar groups are associated to each other and, accordingly, the composition can be a highly viscous liquid even in a non-polymerized state. If it is a viscous liquid, the composition can be adhered more intensely to the metal surface by utilizing the physical adsorption due to Van der Waals force. It is considered that the viscosity is obtained by the entanglement caused between linear molecular chains to each other. In view of the above, it is preferred not to promote crystallization of the phosphorus compound. Specifically, for this purpose, hydrocarbon group has a number of hydrocarbon from 4 to 30, has one or more branched chain structures or one or more carbon-carbon double bond structures, etc.

From a viewpoint of the adhesion, it is necessary that the phosphorus compound forms a composition together with the metal. When the phosphorus compound itself which is not composited with the metal is used, the polarity of the phosphate group portion is small, the association between the polar phosphate groups (cohesion property) is low, and a liquid of high viscosity is not formed. Accordingly, adhesion (viscosity) is low. Further, when the phosphorus compound is composited with ammonia or an amine, the polarity at a portion of the phosphate group is small, and the association (cohesion property) between the phosphate groups, which are polar groups, to each other is low, failing to form a liquid at high viscosity. Accordingly, the adhesion (viscosity) is low.

The hydrocarbon group includes more specifically, for example, oleyl group, stearyl group, isostearyl group, 2-ethylhexyl group, butyloctylgroup, isomyristylgroup, isocetyl group, hexyldecyl group, octyldecyl group, octyldodecyl group, and isobehenyl group.

Then, the specific acid phosphate ester includes, for example, butyloctyl acid phosphate, isomyristyl acid phosphate, isocetyl acid phosphate, hexyldecyl acid phosphate, isostearyl acid phosphate, isobehenyl acid phosphate, octyldecyl acid phosphate, octyldodecyl acid phosphate, isobutyl acid phosphate, 2-ethylhexyl acid phosphate, isodecyl acid phosphate, laurylacidphosphate, tridecyl acid phosphate, stearyl acid phosphate, oleyl acid phosphate, myristyl acid phosphate, palmityl acid phosphate, di-butyloctyl acidphosphate, di-isomyristyl acid phosphate, di-isocetyl acid phosphate, di-hexyldecyl acid phosphate, di-isostearyl acid phosphate, di-isobehenyl acid phosphate, di-octyldecyl acid phosphate, di-octyldodecyl acid phosphate, di-isobutyl acid phosphate, di-2-ethylhexyl acid phosphate, di-isodecyl acid phosphate, di-tridecyl acid phosphate, di-oleyl acid phosphate, di-myristyl acid phosphate, di-palmityl acid phosphate, etc. Among them, from a viewpoint, for example, of non-crystallinity and molecular chain entanglement with the lubricant base oil, oleyl acid phosphate and isostearyl acid phosphate are preferred.

The molecular weight of the composition of the phosphorus compound and the metal is preferably 3,000 or lower because the compatibility with the base oil is improved by fine dispersion. It is more preferably 2,500 or lower. Further, it is preferably 80 or higher, and more preferably 100 or higher from a viewpoint, for example, of separation restriction due to increased concentration of the polar group. The molecular weight can be obtained by calculation. For the below described IS-SA-Ca, the molecular weight (weight-average molecular weight) is measured by GPC.

To the present anticorrosive agent, an organic solvent, a stabilizer, a corrosion inhibitor, a dye, a viscosity improver, a filler, etc. can be added in addition to the base oil (A), and the metal adsorbent (B) as long as the function of the present anticorrosive agent is not deteriorated.

In the present anticorrosive agent, the mass ratio (A):(B) of the base oil (A) and the metal adsorbent (B) is within a range of 50:50 to 98:2. Thus, the present anticorrosive agent is excellent in adhesion to a metal, refrains from leaking from a metal surface under the high temperature conditions, and stably protects the metal surface. Further, the anticorrosive agent forms a film having a thickness to exhibit an excellent anticorrosion property. In the present anticorrosive agent, the mass ratio (A):(B) of the base oil (A) and the metal adsorbent (B) is preferably within a range of 60:40 to 95:5 and more preferably within a range of 70:30 to 90:10 from the viewpoint of having a sufficient film thickness and an adhesion to a metal.

The present anticorrosive agent may be obtained by mixing of the base oil (A), the metal adsorbent (B), and components to be added if needed. The present anticorrosive agent may be applied on the surface of a coating material by spreading the present anticorrosive agent on the surface of a material to be coated or immersing a coating material into the present anticorrosive agent.

The thickness of the film coated on the surface of the material to be coated is preferably 100 μm or smaller from a viewpoint of preventing outward flow or preventing leakage from the coated portion. It is more preferably 50 μm or smaller. On the other hand, it is preferably at a predetermined thickness or larger from a viewpoint, for example, of mechanical strength, etc. of the film to be coated. The lower limit of the film thickness includes, for example, 0.5 μm, 2 μm, 5 μm, etc.

The present anticorrosive agent can be used, for example, to lubrication or corrosion protection, etc. For use in the corrosion protection, it can be used, for example, as an anticorrosive agent for a terminal-fitted electric wire.

Next, a terminal-fitted electric wire according to the present invention is to be described.

A terminal-fitted electric wire according to the present invention is an electric wire in which terminal is connected to the conductor end of the insulation electric wire, and the electric connection portion between the terminal and the electric wire conductor is covered with a film of the present anticorrosive agent. Thus, corrosion at the electric connection portion is prevented.

Figure 2:
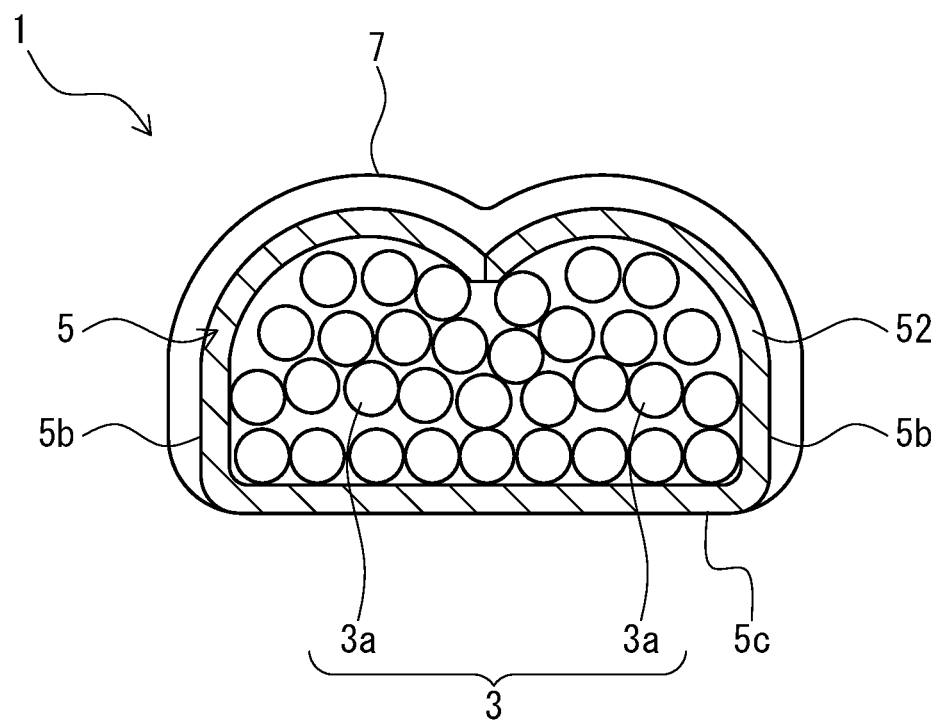
FIG. 2 is a longitudinal cross sectional view along line A-A in FIG. 1.

FIG. 1 is a perspective view of a terminal-fitted electric wire according to a preferred embodiment of the present invention, and FIG. 2 is a vertical cross sectional view along line A-A in FIG. 1. As illustrated in FIG. 1 and FIG. 2, in a terminal-fitted electric wire 1, an electric wire conductor 3 of a covered electric wire 2 covered with an insulation covering (insulator) 4 and a terminal 5 are electrically connected by an electric connection portion 6.

The terminal 5 has a tab-shaped connection part 51 formed by an elongate flat plate to be connected with a mating terminal, and an electric wire fixing portion 54 containing a wire barrel 52 and an insulation barrel 53 formed at the extended end of the connection portion 51. The terminal 5 can be formed (fabricated) to a predetermined shape by pressing a plate material made of a metal.

In the electric connection portion 6, the insulation covering 4 at the end of the covered electric wire 2 is stripped to expose the electric wire conductor 3, and the exposed electric wire conductor 3 is press-bonded to one side of the terminal 5 to connect the covered electric wire 2 with the terminal 5. The wire barrel 52 of the terminal 5 is crimped over the electric wire conductor 3 of the covered electric wire 2 to electrically connect the electric wire conductor 3 with the terminal 5. Further, the insulation barrel 53 of the terminal 5 is crimped over the insulation covering 4 of the covered electric wire 2.

In the terminal-fitted electric wire 1, a range surrounded by a dotted chain is covered with a film 7 obtained from the present anticorrosive agent. Specifically, a range from the surface portion of the terminal 5 ahead of the top end of the electric wire conductor 3 partially exposed from the insulation covering 4 to the surface portion of the insulation covering 4 behind the backward end of the electric wire conductor 3 partially exposed from the insulation covering 4 is covered with the film 7. That is, on the side of the top end 2a of the covered electric wire 2, the terminal-fitted electric wire 1 is covered with the film 7 in a range that protrudes slightly from the top end of the electric wire conductor 3 to the side of the connection portion 51 of the terminal 5. On the side of the top end 5a of the terminal 5, the terminal-fitted electric wire 1 is covered with the film 7 in a range that protrude slightly from the end of the insulation barrel 53 to the side of the insulation covering 4 of the covered electric wire 2. Then, as shown in FIG. 2, the lateral side 5b of the terminal 5 is also covered with the film 7. The back surface 5c of the terminal 5 may or may not be covered with the film 7. The peripheral end of the film 7 contains a portion in contact with the surface of the terminal 5, a portion in contact with the surface of the electric wire conductor 3, and a portion in contact with the surface of the insulation covering 4.

In this way, the electric connection portion 6 is covered with the film 7 at a predetermined thickness along the shape of the outer periphery of the terminal 5 and the covered electric wire 2. Thus, a portion of the electric wire 2 from which the electric wire conductor 3 is exposed is completely covered with the film 7 so as not to be exposed to the outside. Accordingly, the electric connection portion 6 is completely covered with the film 7. Since the film 7 has excellent adhesion to all of the electric wire conductor 3, the insulation covering 4, and the terminal 5, the film 7 prevents intrusion of moisture, etc. from the outside to the electric wire conductor 3 and the electric connection portion 6, which may corrode the metal portion. Further, since the film 7 is excellent in adhesion, a gap is less likely to be formed between the film 7 and any of the electric wire conductor 3, the insulation covering 4, and the terminal 5 at the peripheral end of the film 7 even when the electric wire is bent, for example, in the process from the production of the wire harness to the attachment to a vehicle, thereby maintaining the waterproofness and corrosion protection function.

The present composition forming the film 7 is coated for a predetermined range. For the coating of the present composition forming the film 7, known methods such as dripping, coating, etc. can be used. The present anticorrosive agent is excellent in fluidity at room temperature, and therefore coating with the present anticorrosive agent is performed at room temperature.

The film 7 is formed at a predetermined thickness for a predetermined range. The thickness is, preferably, within a range of 0.01 to 0.1 mm. If the film 7 is excessively thick, it is difficult to insert the terminal 5 into the connector. If the film 7 is excessively thin, the corrosion protection function tends to be lowered.

The electric wire conductor 3 of the covered electric wire 2 is a stranded wire composed of a plurality of wires 3a. In this case, the stranded wire may be composed of a single type of metal wires or two or more types of metal wires. Further, the stranded wire may also be composed of organic fibers in addition to metal wires. The stranded wire composed of a single type of metal wires means that all metal wires forming the stranded wire are formed from the same metal material, while the stranded wire composed of two or more types of metal wires means that the stranded wire contains metal wires formed from different metal materials. The stranded wire may also include reinforcing wires (tension members) for reinforcing the covered electric wire 2.

The material for metal wire forming the electric wire conductor 3 includes, for example, copper, copper alloys, aluminum, aluminum alloys, or materials formed by applying various platings to the materials described above. The material for the metal wire as the reinforcing wires includes, for example, copper alloys, titanium, tungsten, stainless steel, etc. Further, the organic fibers as the reinforcing wire include, for example, KEVLAR. Metal wires forming the electric wire conductor 3 are preferably aluminum, aluminum alloys or materials formed by applying various types of plating to the materials described above from a viewpoint of reducing the weight.

The material for the insulation covering 4 includes, for example, rubber, polyolefin, PVC, thermoplastic elastomer, etc. They may be used alone or two or more of them may be used in combination. Various additives may be added properly to the material of the insulation covering 4. The additives include, for example, flame retardants, fillers, colorants, etc. The material for the insulation covering 4 includes, for example, a soft vinyl chloride resin composed of a vinyl chloride resin and a plasticizer. Examples of the plasticizer include a phthalate plasticizer such as di-isononyl phthalate (DINP), a trimellitate ester plasticizer such as tris(2-ethylhexyl)trimellitate, an aliphatic dibasic acid ester plasticizer such as 2-ethylhexyl adipate and dibutyl sebacate, an epoxy plasticizer such as epoxidized soybean oil, and a phosphate plasticizer such as tricresyl phosphate. Among them, DINP is the most common plasticizer used for the covering member of the insulated wires of a wiring harness for automobiles.

The material for the terminal 5 (material for matrix) includes various copper alloys, copper, etc. in addition to generally used brass. The surface of the terminal 5 may be applied with plating of various metals such as tin, nickel, and gold partially (for example, to contacts) or entirely.

While a terminal is press-bonded to the end of the electric wire conductor in the terminal-fitted electric wire 1 illustrated in FIG. 1, other known electric connection methods such as welding may also be used instead of the press-bonding connection.

As described above, the present anticorrosive agent contains at a specified mass composition ratio the base oil (A) having a viscosity of 30 mPa·s or higher at 100° C., and the metal adsorbent (B) containing the phosphorus compound. Having this composition, the anticorrosive agent maintains its anticorrosion property when the agent is applied to the connection part of the terminal-fitted electric wire containing a covering member containing a plasticizer, and is exposed to high temperature. The high temperature is defined as a temperature, for example, to which the terminal-fitted electric wire is exposed upon mounted in a vehicle such as an automobile. The leak of the metal surface coating composition from the connection part presumably occurs because the plasticizer contained in the covering member of the terminal-fitted electric wire is absorbed in the anticorrosive agent, and thus the flowable temperature of the agent is lowered. The migration of the plasticizer is presumably caused by high affinity between the base oil of the anticorrosive agent and the plasticizer. In the present invention, the base oil having a high viscosity is used to increase the flowable temperature of the entire anticorrosive agent and lower the affinity between the base oil and the plasticizer, whereby the migration of the plasticizer is suppressed. Hence, the anticorrosive agent maintains its anticorrosion property even when it is exposed to high temperature. When the viscosity of the base oil is higher, the migration of the anticorrosive agent at high temperature is more suppressed, resulting in more effective maintaining of the anticorrosion property.

The metal adsorbent (b) is the composition of a phosphorus compound containing one or more compounds represented by the general formulae (1) and (2) and the metal, showing an excellent adhesion to the metal surface and further preventing the anticorrosive agent from leaking from the metal surface. When the phosphorus compound has one or more branched linear structures or one or more carbon-carbon double bond structures in the structure of the hydrocarbon groups, the retention of the base oil is improved, and further the leak of the anticorrosive agent from the metal surface is prevented. When the metal forming the composition together with the phosphorus compound is at least one selected from alkali metals, alkaline earth metals, aluminum, titanium, and zinc, an excellent adhesion to the metal surface is obtained and further the leak of the anticorrosive agent from the metal surface due to high ionization tendency of the metal is prevented. When the composition of the phosphorus compound and the metal has a molecular weight of 3000 or lower, excellent compatibility with the base oil is obtained, the retention of the base oil is improved, and further the leak of the anticorrosive agent from the metal surface is prevented.

In the terminal-fitted electric wire coated with the anticorrosive agent according to the present invention, the electric connection part between the terminal and the electric conductor is covered with the anticorrosive agent, and thus the anticorrosion property of the wire is maintained even when it is exposed to high temperature upon mounted in an automobile.

EXAMPLE

The present invention is to be described by way of examples but the present invention is not restricted to the examples.

(Preparation of Metal Adsorbent)

<Preparation Example 1> OL-Ca

Into a 500 mL flask, 50 g (acid value: 0.163 mol) of oleyl acid phosphate ("Phoslex A18D" manufactured by SC Organic Chemical Co., Ltd., molecular weight: 467 (average), acid value: 183 mg KOH/g) and 50 mL of methanol were put into and stirred at room temperature to form a uniform solution. Into the solution, 6.04 g (0.0815 mol) of calcium hydroxide was added. The suspension was stirred for 24 hours at room temperature, and filtered after confirming that there was no calcium hydroxide precipitates. Then, methanol and generated water were distilled off under a reduced pressure by a rotary evaporator. Then, after adding 50 mL of toluene, the generated water was distilled off by azeotropy through vacuum distillation to obtain a clear and high-consistency aimed product.

(Preparation of Anticorrosive Agent)

Anticorrosive agents were prepared by mixing the metal adsorbent prepared as preparation example 1, and a base oil at the ratios shown in table 1 at 160° C. The physical properties of the base oil a, b, c, d, and e are shown below. The shear viscosity of the base oil was measured at 100° C. at a shear rate of 100/s according to JIS K7117-2.

Base oil a: Mineral type base oil (shear rate=1500 mPa·s (100° C.)).

Base oil b: Synthetic type base oil (shear rate=500 mPa·s (100° C.)).

Base oil c: Synthetic type base oil (shear rate=150 mPa·s (100° C.)).

Base oil d: Mineral type base oil (shear rate=30 mPa·s (100° C.)).

Base oil e: Mineral type base oil (shear rate=15 mPa·s (100° C.).

(Evaluation of Anticorrosion Property)

The anticorrosive agent heated to 160° C. to be liquefied was applied onto an electric connection part between a terminal made of copper and an aluminum conductor of a terminal-fitted electric wire to cover the electric connection part, as illustrated in FIG. 1 (covering member: soft polyvinyl chloride resin containing a polyvinyl chloride resin and a plasticizer). Then, the terminal-fitted electric wire was left for 168 hours in a thermostatic chamber held at 100° C. Then, a salt spray test was conducted at 35° C. (concentration of solution of salt: 50 g/L) according to JIS C0024 to evaluate generation of rust after 120 hours had passed from starting of the salt spraying. If rust was found even at a single sample among 10 samples (N=10), the anticorrosive agent was regarded as "poor" in anticorrosion property. If rust was not found in any samples, the anticorrosive agent was evaluated as "good" in anticorrosion property.

TABLE 1

| | Examples | | | | | | | | | | Comparative Examples | | | | |
|---|---|---|---|---|---|---|---|---|---|---|---|---|---|---|---|
| | 1 | 2 | 3 | 4 | 5 | 6 | 7 | 8 | 9 | 10 | 1 | 2 | 3 | 4 | 5 |
| Base oil a (1500 mPa · s) | | | | | | | 80 | | | | | | | | |
| Base oil b (500 mPa · s) | | | | | | | | 80 | | 40 | | | | | |
| Base oil c (150 mPa · s) | 98 | 95 | 90 | 80 | 60 | 50 | | | | 40 | 99 | | 100 | 0 | 40 |
| Base oil d (30 mPa · s) | | | | | | | | | 80 | | | | | | |
| Base oil e (15 mPa · s) | | | | | | | | | | | | 90 | | | |
| Metal adsorbent | 2 | 5 | 10 | 20 | 40 | 50 | 20 | 20 | 20 | 20 | 1 | 10 | 0 | 100 | 60 |
| Anticorrosion property | Good | Good | Good | Good | Good | Good | Good | Good | Good | Good | Poor | Poor | Poor | Poor | Poor |

In comparative examples 1, 3, 4, and 5, the mass composition ratio of the base oil and the metal adsorbent did not fall in the scope of the present invention. In comparative example 1, the amount of the metal adsorbent was small. In comparative example 3, the metal adsorbent was not contained. In comparative example 4, the base oil was not contained. In comparative example 5, the amount of the metal adsorbent was large. Hence, in comparative examples 1, 3, 4, and 5, the anticorrosive agent did not have sufficient anticorrosion property since the agent leaked when it was left at a high temperature. In comparative example 2, the shear viscosity of the base oil was low and did not fall in the scope of the present invention. Hence, the anticorrosive agent did not have sufficient anticorrosion property since the agent leaked when it was left at a high temperature. Meanwhile, in each of examples 1-10, the anticorrosive agent was prepared to contain a base oil having a shear viscosity of 30 mPa·s or higher at 100° C., and a metal adsorbent containing a phosphorus compound at a mass composition ratio in the scope of the present invention. Hence, the anticorrosive agent of each example did not cause any leak or caused only a small leak, maintained its anticorrosion property even when it was left at a high temperature, and had satisfactory anticorrosion property. The migration of the plasticizer from the covering member of the wires to the anticorrosive agent was observed in each example and comparative example.

Next, 100 parts by mass of the anticorrosive agent prepared in example 1 (base oil c: 98 parts by mass; metal adsorbent: 2 parts by mass) was mixed with DINP as the plasticizer in a predetermined ratio. By using a cone-plate type rotary viscometer, the shear viscosity of the obtained mixtures was measured at 25° C. or 100° C. at a shear rate of 100/s according to JIS K7117-2. The results are presented in table 2 below.

TABLE 2

| Amount parts by mass | Shear viscosity of mixtures | |
|---|---|---|
| | 25° C. mPa · s | 100° C. mPa · s |
| 0 | 1000 | 120 |
| 3 | 850 | 105 |
| 5 | 800 | 100 |
| 10 | 650 | 95 |
| 20 | 400 | 76 |

Table 2 shows that when the amount of the plasticizer is larger, the shear viscosity of the anticorrosive agent is lowered. In other words, the flowable temperature of the anticorrosive agent is lowered as the migration amount of the plasticizer is larger. The migration of the plasticizer from the covering member of the wires to the anticorrosive agent, which was observed in each example, caused leak of the anticorrosive agent when it was exposed to high temperature, resulting in degradation in anticorrosion property of the agent.

The embodiment of the present invention has been described specifically but the present invention is no way restricted to the embodiment described above but can be modified variously within a range not departing from the gist of the present invention.

The invention claimed is:

1. An anticorrosive agent comprising:
a base oil (A) having a viscosity of 100 mPa·s or higher at 100° C., and
a composition (B) comprising a phosphorus compound and a metal atom, wherein
a mass composition ratio (A):(B) of the base oil (A) and the composition (B) is within a range of 50:50 to 98:2, and
the phosphorus compound comprises one or more compounds represented by the general formulae (1) and (2):

[Chem. 1]

(1)
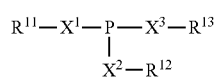

[Chem. 2]

(2)
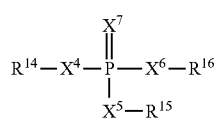

where $X^1$ to $X^7$ each represent independently an oxygen atom or a sulfur atom, $R^{11}$ to $R^{13}$ each represent independently a hydrogen atom or a hydrocarbon group having 1 to 30 carbon atoms, among which at least one is a hydrocarbon group having 1 to 30 carbon atoms, and $R^{14}$ to $R^{16}$ each represent independently a hydrogen atom or a hydrocarbon group having 1 to 30 carbon atom among which at least one is a hydrocarbon group having 1 to 30 carbon atoms.

2. The anticorrosive agent according to claim 1, wherein the phosphorus compound has one or more branched linear structures or one or more carbon-carbon double bond structures in a structure of the hydrocarbon groups.

3. The anticorrosive agent according to claim 1, wherein the metal atom in the composition (B) is at least one selected from alkali metals, alkaline earth metals, aluminum, titanium, and zinc.

4. The anticorrosive agent according to claim 1, wherein the composition (B) has a molecular weight of 3000 or lower.

5. A terminal-fitted electric wire, wherein an electric connection part between a terminal and an electric conductor is covered with the anticorrosive agent according to claim 1.

* * * * *